United States Patent
Sprenger et al.

(10) Patent No.: US 10,435,932 B2
(45) Date of Patent: *Oct. 8, 2019

(54) FASTENERLESS HINGE WHICH ENABLES THIN FORM FACTOR LOW COST DESIGN

(71) Applicant: INTEL CORPORATION, Sunnyvale, CA (US)

(72) Inventors: Mark E. Sprenger, Folsom, CA (US); Kenan Arik, Hillsboro, OR (US); Drew G. Damm, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 15/609,010

(22) Filed: May 31, 2017

(65) Prior Publication Data

US 2017/0260786 A1 Sep. 14, 2017

Related U.S. Application Data

(62) Division of application No. 14/752,938, filed on Jun. 27, 2015, now Pat. No. 9,703,327.

(51) Int. Cl.
*E05D 7/10* (2006.01)
*G06F 1/16* (2006.01)

(52) U.S. Cl.
CPC ............. *E05D 7/1061* (2013.01); *E05D 7/10* (2013.01); *G06F 1/1616* (2013.01);
(Continued)

(58) Field of Classification Search
CPC ....... E05D 7/10; E05D 7/1061; E05D 7/1066; E05D 7/1072; E05D 7/1077;
(Continued)

(56) References Cited

U.S. PATENT DOCUMENTS

| 864,690 | A | * | 8/1907 | Rice | ............... | E05D 7/12 |
| | | | | | | 16/271 |
| 1,196,580 | A | * | 8/1916 | Pelot | ............... | E05D 5/08 |
| | | | | | | 16/382 |

(Continued)

FOREIGN PATENT DOCUMENTS

| CN | 1326616 A | 12/2001 |
| EP | 1688572 A2 | 8/2006 |
| JP | 2000204827 A | 7/2007 |

OTHER PUBLICATIONS

Notice of Allowance dated May 23, 2017, issued in related U.S. Appl. No. 14/752,938, 13 pages.

(Continued)

*Primary Examiner* — Jeffrey O'Brien
(74) *Attorney, Agent, or Firm* — Schwabe, Williamson & Wyatt, P.C.

(57) ABSTRACT

The present disclosure includes a fastenerless hinge system which enables a thin form factor low cost design. A hinge system described herein may include a hinge bracket and a hinge wing. The hinge bracket includes an elevated portion thereby providing a hollow region and one or more spring tabs. The hinge wing is slidably coupled to the hinge bracket through the hollow portion. Advantageously, a hinge system consistent with the present disclosure does not include fasteners such that the "Z" height of the computing device may be minimized in addition to reducing costs.

4 Claims, 6 Drawing Sheets

(52) U.S. Cl.
CPC .............. *G06F 1/1681* (2013.01); *G06F 1/16* (2013.01); *Y10T 16/554* (2015.01)

(58) Field of Classification Search
CPC ......... E05D 7/1083; E05D 7/12; E05D 7/121; E05D 7/123; Y10T 16/535; Y10T 16/5367; Y10T 16/5369; Y10T 16/554; Y10T 16/5543
See application file for complete search history.

(56) References Cited

U.S. PATENT DOCUMENTS

| | | | | |
|---|---|---|---|---|
| 1,740,866 A * | 12/1929 | McBarron | ............... | E05D 11/10 16/293 |
| 2,144,481 A * | 1/1939 | Bryant | ...................... | E05D 5/04 16/383 |
| 2,735,133 A * | 2/1956 | Hey | .................. | E05D 5/02 16/383 |
| 3,284,844 A * | 11/1966 | Seckerson | .............. | B60J 3/0265 16/259 |
| 3,285,464 A * | 11/1966 | Boydman | ................ | E05D 1/02 220/377 |
| 3,618,993 A * | 11/1971 | Platte | ..................... | B65D 67/02 16/257 |
| 3,689,115 A * | 9/1972 | Andreini | ............... | E05D 5/0215 16/257 |
| 3,728,758 A * | 4/1973 | Johansen | ................... | E05D 7/02 16/257 |
| 3,889,736 A * | 6/1975 | Firks | ....................... | A47G 5/00 16/225 |
| 3,916,480 A * | 11/1975 | Smith | ........................ | E05D 5/04 16/383 |
| 3,965,532 A * | 6/1976 | Wigfall | ...................... | E05D 7/12 16/270 |
| 4,011,706 A * | 3/1977 | Dupree | .............. | A47B 88/9412 403/231 |
| 4,087,883 A * | 5/1978 | Amdal | ................... | E05C 17/30 16/82 |
| 4,099,293 A * | 7/1978 | Pittasch | ................... | E05D 5/08 16/245 |
| 4,157,600 A * | 6/1979 | Thomas | .................... | E05D 7/10 16/376 |
| 4,185,357 A * | 1/1980 | Busse | ....................... | E05D 5/08 16/236 |
| 4,863,062 A * | 9/1989 | Holliday | .............. | B65D 21/062 220/845 |
| 5,031,270 A | 7/1991 | Lee | | |
| 5,193,308 A * | 3/1993 | Davidian | ................ | E05D 5/023 16/257 |
| 5,337,911 A * | 8/1994 | Holub | .................... | A45C 11/20 16/383 |
| 5,381,920 A * | 1/1995 | Lin | .......................... | B25H 3/02 16/261 |
| 6,003,203 A * | 12/1999 | Fowlston | ............. | B65D 43/168 16/225 |
| 6,030,064 A * | 2/2000 | Kim | ...................... | E05D 7/0423 16/271 |
| 6,079,081 A * | 6/2000 | Padiak | ..................... | G09F 7/18 16/321 |
| 6,079,993 A * | 6/2000 | Laine | ..................... | H01R 35/02 16/223 |
| 6,202,256 B1 * | 3/2001 | Bovio | ................... | G06F 1/1616 16/382 |
| 6,286,918 B1 * | 9/2001 | King | ......................... | E05D 5/02 16/382 |
| 6,389,643 B1 * | 5/2002 | Lim | ...................... | G06F 1/1616 16/260 |
| 6,438,798 B1 | 8/2002 | Chene et al. | | |
| 6,484,360 B1 * | 11/2002 | DeBartolo, Jr. | ...... | H02G 3/0487 16/95 R |
| 6,691,371 B2 * | 2/2004 | Migli | ........................ | E05D 7/04 16/267 |
| 6,715,181 B1 * | 4/2004 | Fries | ...................... | E05D 7/0415 16/240 |
| 6,845,005 B2 | 1/2005 | Shimano et al. | | |
| 7,090,095 B2 * | 8/2006 | Schafer | ................ | B65D 43/166 16/262 |
| 7,108,372 B2 * | 9/2006 | Li | ............................ | G02C 5/10 16/228 |
| 7,346,959 B2 * | 3/2008 | Heid | ...................... | E05D 7/0027 16/242 |
| 7,350,272 B2 * | 4/2008 | Fries | ......................... | E05D 7/02 16/236 |
| 7,467,441 B2 * | 12/2008 | Lee | ........................ | G06F 1/1616 16/254 |
| 7,587,788 B2 | 9/2009 | Heid | | |
| 7,765,643 B2 * | 8/2010 | Vanini | ................... | F24C 15/023 16/286 |
| 8,144,477 B2 * | 3/2012 | Hamada | ................ | G06F 1/1681 361/755 |
| 8,720,009 B2 | 5/2014 | Schneider | | |
| 8,732,909 B2 * | 5/2014 | Fellman | ................ | E05D 5/0215 16/382 |
| RE46,089 E * | 8/2016 | Brunnmayr | ............. | E05F 5/006 |
| 9,703,327 B2 * | 7/2017 | Sprenger | .................. | G06F 1/1681 |
| 2004/0034966 A1 * | 2/2004 | Wegman | ................ | E05D 5/06 16/254 |
| 2010/0043178 A1 * | 2/2010 | Reisel | ...................... | F16F 1/48 16/86 R |
| 2015/0338889 A1 * | 11/2015 | Liang | .................... | G06F 1/1632 361/679.29 |

OTHER PUBLICATIONS

International Search Report and Written Opinion dated Sep. 22, 2016, issued in related International Application No. PCT/US2016/39676, 9 pages.
Extended European Search Report dated Jan. 17, 2019 for European Patent Application No. 16818560.1, 19 pages.

* cited by examiner

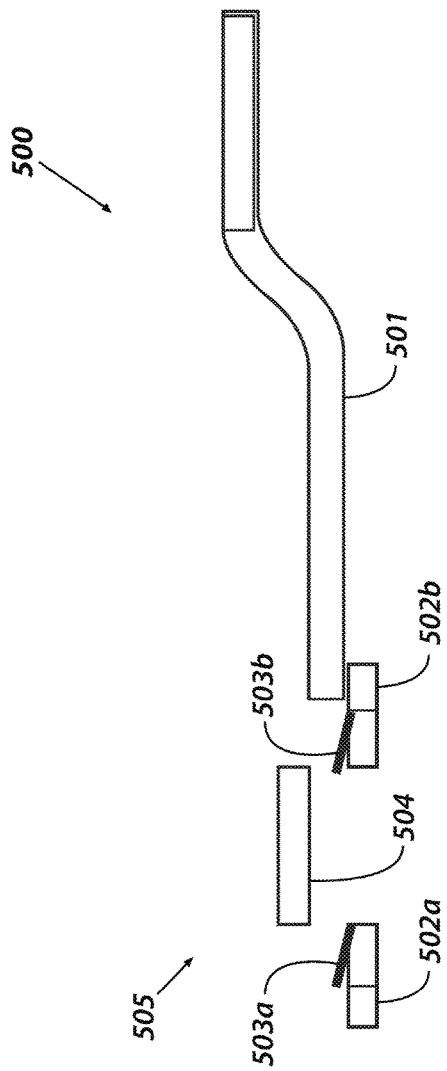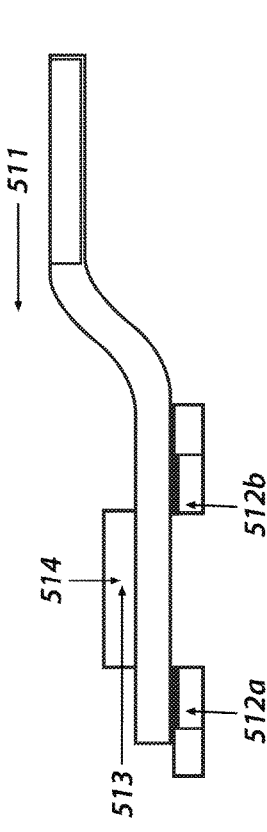

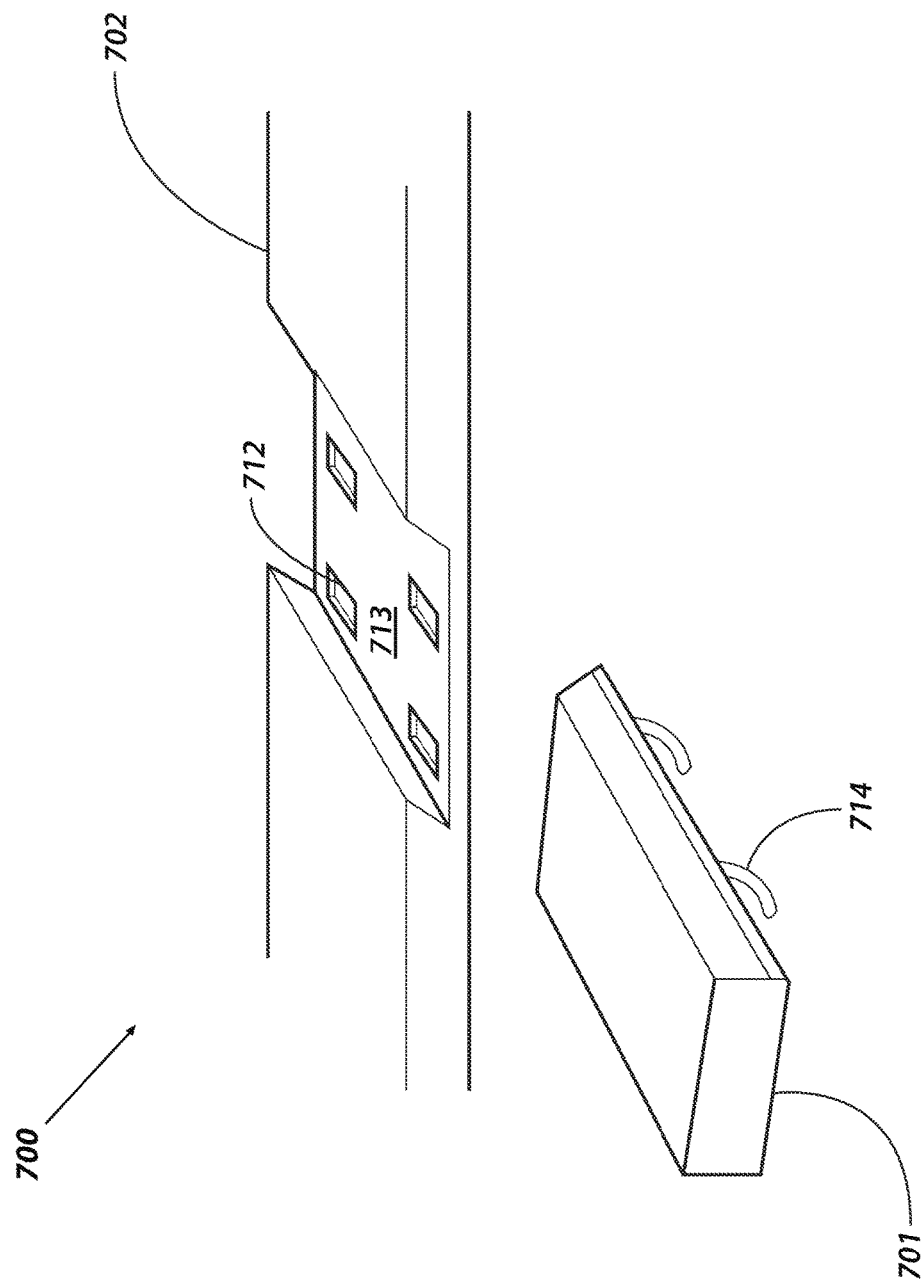

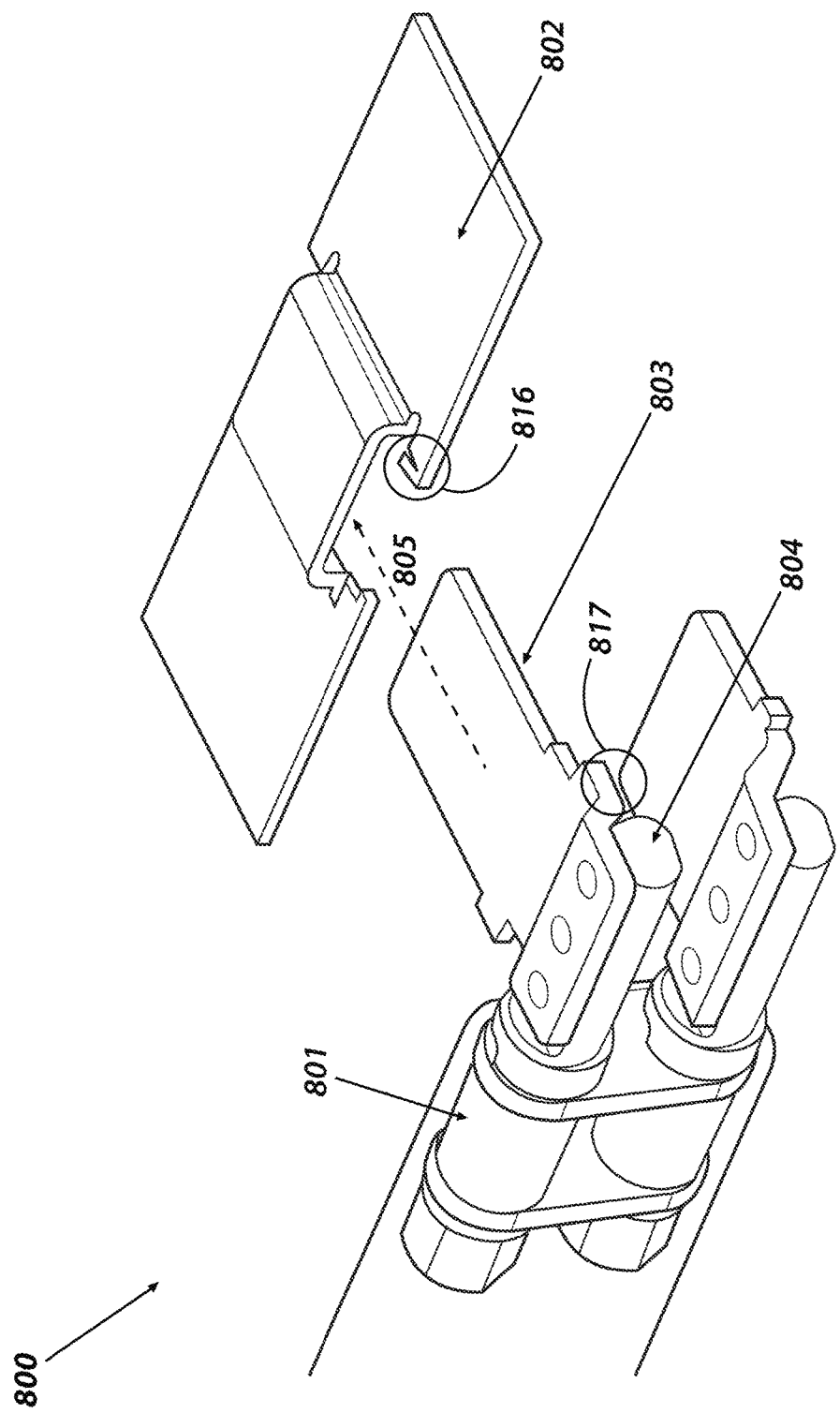

FASTENERLESS HINGE WHICH ENABLES THIN FORM FACTOR LOW COST DESIGN

RELATED APPLICATIONS

This application claims the benefit of priority from U.S. Non-Prov. patent application Ser. No. 14/752,938 filed Jun. 27, 2015 which is entirely incorporated by reference herein.

FIELD

Embodiments described herein generally relate to convertible 2-in-1 computing systems and more particularly to a fastenerless hinge which enables a thin form factor low cost design.

BACKGROUND

Clamshell and convertible systems, such as 2-in-1 computing systems, require a hinge system to attach the lid and base assemblies. As the industry moves towards thinner and lighter computing systems, conventional techniques for attaching hinges is becoming a limiting factor of the system, particularly the lid's height.

Hinge systems in conventional computing systems include a torque engine, hinge pin, and hinge wings that are stamped metal which fit into a chassis and fixed with pins and screws. Most notably, conventional computing systems include screw bosses, brackets, and screws which add to the overall height and cost of computing systems.

As such, there exists a need to eliminate some of the assembly parts to save cost and reduce the height while still maintaining the hinge system's core functionality. The present disclosure addresses this need.

BRIEF DESCRIPTION OF THE DRAWINGS

FIGS. 5A-5B are schematics of an assembled and disassembled hinge system.

FIG. 7 is a perspective view of an exemplary hinge system in accordance with an embodiment of the present disclosure.

FIG. 8 is a perspective view of an exemplary hinge system coupled to a notebook computing device in accordance with an embodiment of the present disclosure.

DETAILED DESCRIPTION

A detailed description of some embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to some embodiments have not been described in detail to avoid unnecessarily obscuring the description.

Figure 1:
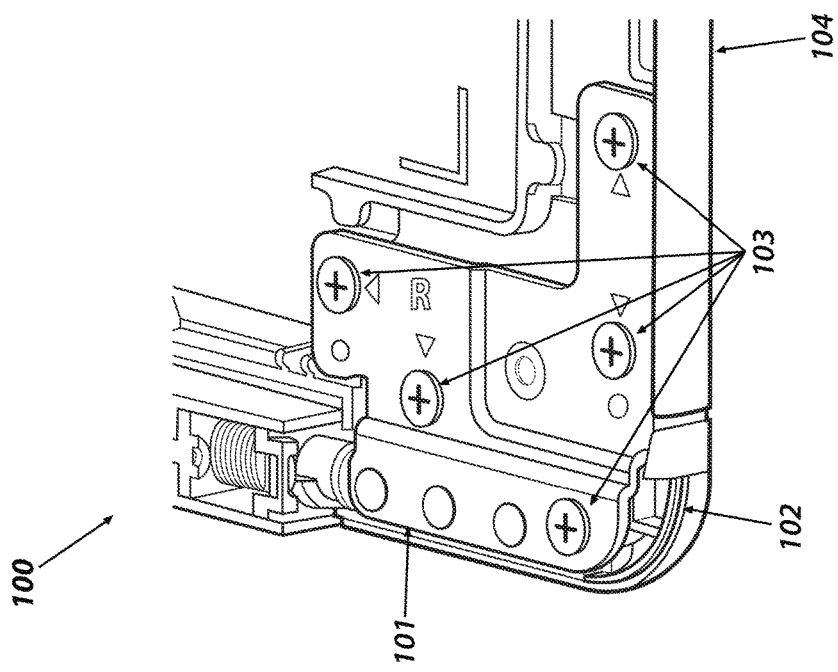
FIG. 1 is a conventional hinge system for a computing device known in the art.

FIG. 1 is a conventional hinge system for a computing device 100 known in the art. In particular, this figure exposes an inner portion of the chassis 101 of the computing device 100. In some embodiments, the chassis includes conventional screw/bolt fasteners 103 to attach a back cover of the computing device 100 to the frame 102 (e.g., metal frame) of the device 100. In addition, any of various conventional fasteners 103 may attach a plastic frame component 104 to the computing device's 100 chassis 101.

Figure 2:
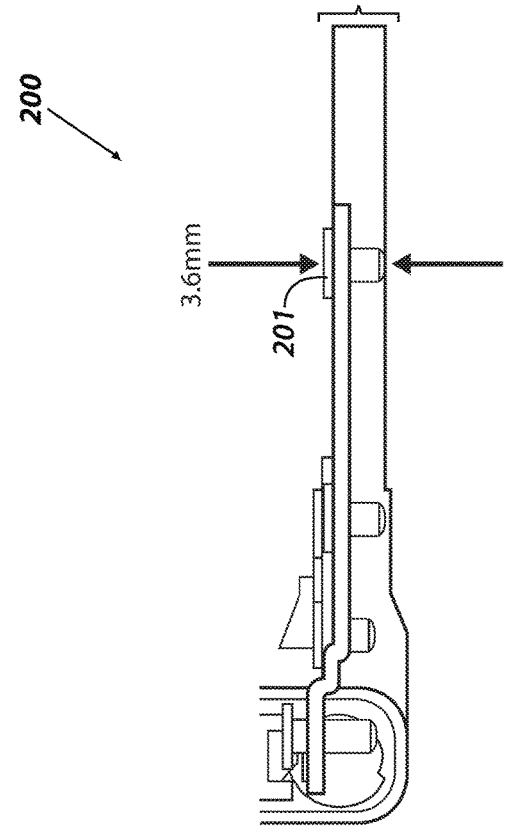
FIG. 2 is a side view of a conventional hinge system for a computing device known in the art.

FIG. 2 is a side view of a conventional hinge system for a computing device 200 known in the art. In this view, the "Z" height 202 of the computing device 200 is shown. For example, the "Z" height of computing device 200 is approximately 3.6 mm. In one more embodiments, the "Z" height of a computing device may be the vertical height that the device extends from a bottom surface when the device is in its ordinary position. Notably, the "Z" height of computing device 200 may be affected by the presence of conventional fasteners 201.

It should be understood by one having ordinary skill in the art that the "Z" height may vary along the length of the computing device 200. However, the present disclosure provides techniques to reduce the "Z" height of the computing device along at least one area as will be described below.

Figure 3:
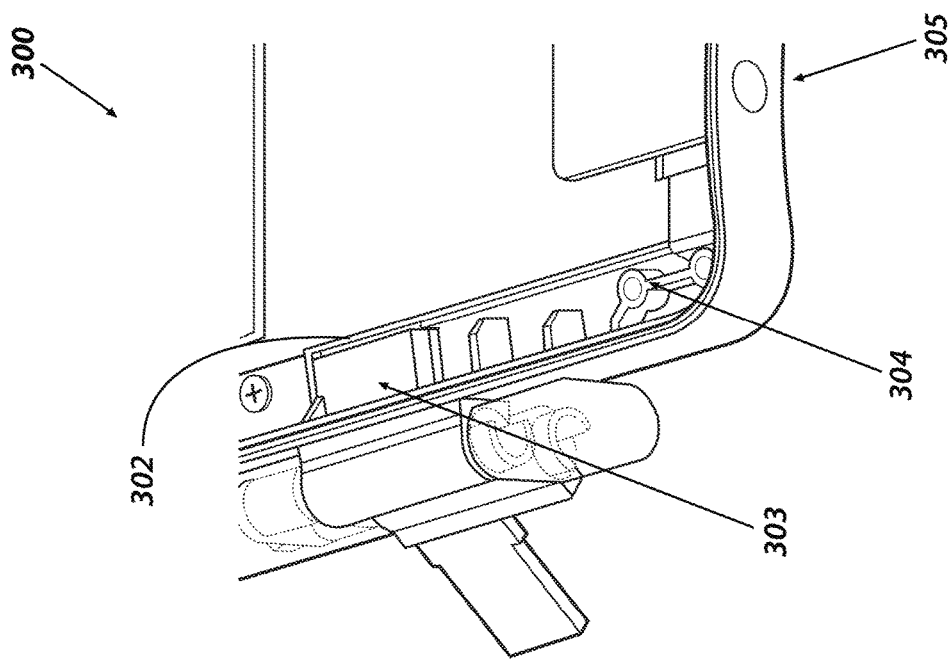
FIG. 3 is an exemplary hinge system for a computing device in accordance with an embodiment of the present disclosure.

FIG. 3 is an exemplary hinge system for a computing device 300 in accordance with an embodiment of the present disclosure. Computing device 300 may be a 2-in-1 device, computer notebook device, computer sub-notebook device, laptop computer, or the like. In an embodiment of the present disclosure, a hinge system consistent with the present disclosure includes a hinge wing 302 and hinge bracket 303. In proximity to the hinge system is a metal support bracket 304 and plastic component 305 of the computing device's 300 chassis. In some embodiments, the hinge bracket 303 and metal support bracket 304 may have a translucent portion such that the hinge wing 302 may be more readily exposed.

Advantageously, the hinge system employed in computing device 300 reduces the device's 300 "Z" height thereby reducing costs. Hinge wing 302 may be considered narrow in comparison to hinge wings in conventional hinge systems.

Figure 4:
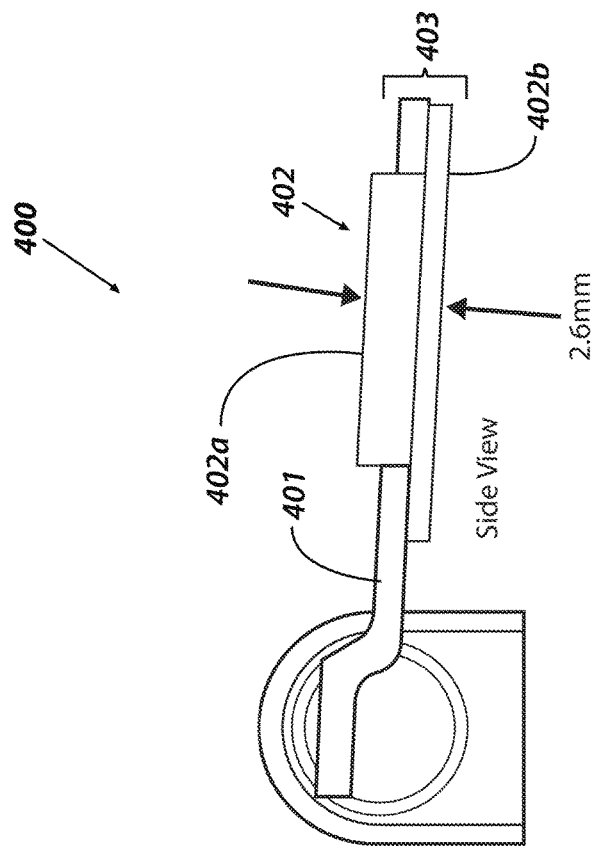
FIG. 4 is a side view of an exemplary hinge system for a computing device in accordance with an embodiment of the present disclosure.

FIG. 4 is a side view of an exemplary hinge system 400 for a computing device in accordance with an embodiment of the present disclosure. Hinge system 400 includes a hinge wing 401 that is fitted in hinge bracket 402. Most notably, the "Z" height of a computing device may be substantially reduced by employing hinge system 400 thereby negating the need to use conventional fasteners known in the art. In the embodiment shown, the "Z" height of the computing device may be between 1.8 mm and 2.8 mm.

FIGS. 5A-5B are schematics of an assembled and disassembled hinge system 500. In particular, FIGS. 5A and 5B show cross sections of the hinge system 500. In FIG. 5A, an elevated portion 504 of a hinge bracket 505 and base portions 502a, 502b of the hinge bracket are shown along with disassembled hinge wing 501.

In some implementations, spring tabs 503a, 503b are disposed in an angular fashion on a top surface of base portions 502a, 502b. In the embodiment shown, the spring tabs 503a, 503b are disposed in an angular fashion to account for the insertion of hinge wing 501 while also providing a force when hinge wing 501 is inserted into the hinge bracket 505.

In some embodiments, spring tabs 503a, 503b may be disposed at an angle from 20° to 45° and may apply a force on the hinge wing 501 in the range of 1.5 lbs. to 2.0 lbs. Accordingly, the insertion force needed to assemble the hinge wing 501 into the hinge bracket 505 may be a function of the force provided by the spring tabs 503a, 503b.

It should be understood by one having ordinary skill in the art that the insertion force may be equal to or different than the extraction force—the force needed to remove the hinge wing 501 from the hinge bracket 505. In some embodiments, the extraction force needed to remove the hinge wing 501 from the hinge bracket 505 is greater than the insertion force needed to insert the hinge wing 501 into the hinge 505.

In FIGS. 5A-5B, two spring tabs 503a, 503b are shown. However, the present disclosure is not limited thereto. Furthermore, spring tabs 503a, 503b are disposed from the base portions 502a, 502b of the hinge bracket 505 at the same angle but the present disclosure is not limited thereto. In some embodiments, spring tabs 503a, 503b may have different spring forces 512a, 512b and may be disposed at different angles from the base portions 502a, 502b of the hinge bracket 505.

FIG. 5B provides an illustration of some of the forces within the hinge system 500. As shown, the insertion force 511 may be a function of the forces provided by the spring tabs (i.e, spring forces 512a, 512b) and the frictional force provided by the contact between the surfaces of the hinge wing 501 and hinge bracket 505 (i.e., frictional force 513). For example, the surfaces of both the hinge wing 501 and hinge bracket 505 may be hard steel or sheet metal steel. In some embodiments, when both surfaces comprise sheet metal steel, the static coefficient of friction may be about 0.78.

In some implementations, a lubricant may be added to the surface of either the hinge wing or hinge bracket to aid in extraction or insertion. The application of wet or dry lubricants to the aforementioned surfaces may yield a static coefficient of friction of approximately 0.3 in some embodiments.

Figure 6:
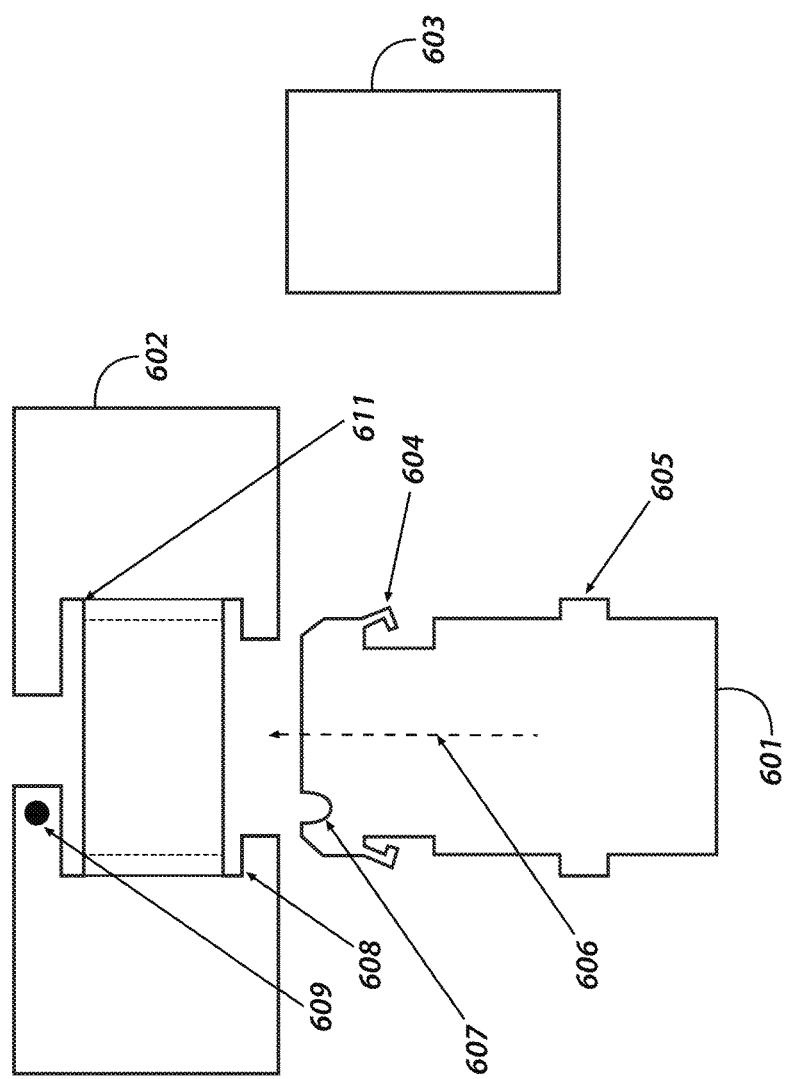
FIG. 6 is top view of an exemplary hinge system in accordance with an embodiment of the present disclosure.

FIG. 6 is top view of an exemplary hinge system 600 in accordance with an embodiment of the present disclosure. Hinge system 600 includes a hinge wing 601, hinge bracket 602, and friction dampening component 603. Hinge wing 601 may have various features such as, but not limited to, mechanical stops 605, alignment groove 607, and insert tabs 604.

In some embodiments, insert tabs 604 have a shallow angle which may be designed to be manipulated by a tool. In some embodiments, the insert tabs 604 are disposed at an angle less than 45°. As such, a tool may be used to compress the insert tabs 604 to withdraw the hinge wing 601. The insert tabs 604 may function as a locking mechanism.

Hinge bracket 602 includes a plurality of features including those described above. In addition, hinge bracket 602 includes a mechanical stop 611 and an alignment component 609. In some implementations, the hinge bracket 602 is internal to the chassis of a computing device.

Hinge wing 601 includes mechanical stops 606 which interact with mechanical stops 608 of hinge bracket 602. In some implementations, mechanical stops 606 has a depth and angular disposition for alignment to lock into the hinge bracket 602. Upon assembly, the hinge wing 601 is inserted in direction 606. Upon assembly, the alignment component 607 of hinge wing 601 meets the alignment feature 609 of hinge bracket 602.

Furthermore, in some embodiments, hinge system 600 includes a friction dampening component 603. Friction dampening component 603 may include a viscoelastic material. Friction dampening component 603 may also include any of various materials such as, but not limited to, silicon, rubber, and foam. In some embodiments, friction dampening component 603 includes an acetal resin material.

FIG. 7 is a perspective view of an exemplary hinge system 700 in accordance with an embodiment of the present disclosure. As shown, hinge wing 701 is to be inserted into hinge bracket 702. Notably, hinge wing 701 includes a plurality of spring tabs 714. For example, hinge wing 701 has four spring tabs 714 that fit within the recesses 712 that are disposed upon an internal surface 713 of the hinge bracket 702.

FIG. 8 is a perspective view of an exemplary hinge system coupled to a notebook computing device 800 in accordance with an embodiment of the present disclosure. In particular, the hinge wing 803 is shown coupled to a hinge pin 804 which is coupled to a torque engine 801 component of a notebook computing device 800.

Upon assembly, hinge wing 803 is to be inserted into hinge bracket 802 in direction 805. Notably, hinge bracket 802 may include an angled alignment and mechanical stop feature 816. Likewise hinge wing 801 may include a mechanical stop 817 which cooperates with alignment and mechanical stop feature 816 of hinge bracket 802.

The above description of illustrated implementations of the present disclosure, including what is described in the Abstract, is not intended to be exhaustive or to limit the present disclosure to the precise forms disclosed. While specific implementations of, and examples for, the present disclosure are described herein for illustrative purposes, various equivalent modifications are possible within the scope of the present disclosure, as those skilled in the relevant art will recognize.

These modifications may be made to the present disclosure in light of the above detailed description. The terms used in the following claims should not be construed to limit the present disclosure to the specific implementations disclosed in the specification and the claims. Rather, the scope of the present disclosure is to be determined entirely by the following claims, which are to be construed in accordance with established doctrines of claim interpretation.

The invention claimed is:

1. A hinge assembly, comprising:
  a hinge bracket;
  wherein the hinge bracket has an elevated portion and a base portion thereby providing a hollow portion between the elevated portion and the base portion;
  the hinge bracket further comprises at least one spring tab extending from the base portion towards the elevated portion in the hollow portion; and
  a hinge wing slidably coupled to the hinge bracket through the hollow portion of the hinge bracket for frictional engagement with the at least one spring tab;
  wherein an insertion force for inserting the hinge wing into the hollow of the hinge bracket is different from an extraction force for removing the hinge wing from the hollow of the hinge bracket due to an orientation of the at least one spring tab.

2. The hinge assembly of claim 1, wherein the at least one spring tab is disposed on the hinge bracket external to the elevated portion of the hinge bracket.

3. The hinge assembly of claim 1, wherein the hinge bracket contains at least one recess to receive the at least one spring tab.

4. The hinge assembly of claim 1, wherein the hinge bracket or the hinge wing comprises sheet metal steel.

\* \* \* \* \*